(12) United States Patent
Korobkov et al.

(10) Patent No.: US 8,811,504 B2
(45) Date of Patent: Aug. 19, 2014

(54) METHOD OF DETERMINING A CHANNEL QUALITY AND MODEM

(75) Inventors: Dimitri Korobkov, Frankfurt (DE); Patrick Langfeld, Karlsruhe (DE); Hans Benninger, Turgi (CH)

(73) Assignee: ABB Technology AG, Zürich (CH)

( * ) Notice: Subject to any disclaimer, the term of this patent is extended or adjusted under 35 U.S.C. 154(b) by 1209 days.

(21) Appl. No.: 12/492,966

(22) Filed: Jun. 26, 2009

(65) Prior Publication Data

US 2009/0316766 A1 Dec. 24, 2009

Related U.S. Application Data

(63) Continuation of application No. PCT/EP2007/064498, filed on Dec. 21, 2007.

(30) Foreign Application Priority Data

Dec. 27, 2006 (EP) .................................... 06405543

(51) Int. Cl.
*H04K 1/10* (2006.01)
*H04L 27/28* (2006.01)

(52) U.S. Cl.
USPC ........... 375/260; 375/227; 375/341; 375/345; 375/346

(58) Field of Classification Search
USPC .......................... 375/260, 227, 346, 341, 345
See application file for complete search history.

(56) References Cited

U.S. PATENT DOCUMENTS

| | | | |
|---|---|---|---|
| 5,668,927 A * | 9/1997 | Chan et al. ................. | 704/240 |
| 6,456,653 B1 * | 9/2002 | Sayeed ....................... | 375/227 |
| 6,807,145 B1 * | 10/2004 | Weerackody et al. ....... | 370/203 |
| 7,020,212 B1 * | 3/2006 | Strait ........................... | 375/260 |

(Continued)

FOREIGN PATENT DOCUMENTS

| | | |
|---|---|---|
| EP | 1 137 194 A2 | 9/2001 |
| WO | WO 97/40609 | 10/1997 |
| WO | WO 98/10553 | 3/1998 |

OTHER PUBLICATIONS

International Search Report (PCT/ISA/210) for PCT/EP2007/064498 dated Jun. 12, 2008.

(Continued)

*Primary Examiner* — Qutbuddin Ghulamali
(74) *Attorney, Agent, or Firm* — Buchanan Ingersoll & Rooney PC

(57) ABSTRACT

Data transmission is disclosed over a transmission channel that is subject to narrowband interferers. An increased overall bit or data transmission rate is achieved by an exemplary method of determining a channel capacity of plural sub-channels of the transmission channel based on a net background noise power estimation. The net background noise power contains only white noise-like contributions and excludes, to a reasonable extent, noise contributions or signal power from narrowband interferers. Hence, the net background noise power can be reduced. For example, an Orthogonal Frequency Division Multiplex (OFDM) signal code construction or bit allocation scheme can be chosen that provides for optimized data transmission at a data rate that approximates or approaches the more realistic channel capacity of an individual sub-channel, resulting in an increased overall bit or data transmission rate.

18 Claims, 1 Drawing Sheet

(56) References Cited

U.S. PATENT DOCUMENTS

| | | | |
|---|---|---|---|
| 7,043,030 B1* | 5/2006 | Furuta | 381/94.1 |
| 7,804,772 B2* | 9/2010 | Min et al. | 370/230 |
| 7,809,067 B2* | 10/2010 | Razzell | 375/260 |
| 2002/0126768 A1 | 9/2002 | Isaksson et al. | |
| 2003/0016123 A1 | 1/2003 | Tager et al. | |
| 2004/0218519 A1 | 11/2004 | Chiou et al. | |
| 2005/0163196 A1* | 7/2005 | Currivan et al. | 375/144 |
| 2006/0120445 A1* | 6/2006 | Okamura | 375/227 |
| 2007/0058695 A1* | 3/2007 | Cheng et al. | 375/148 |

OTHER PUBLICATIONS

Written Opinion (PCT/ISA/237) for PCT/ EP2007/064498 dated Jun. 12, 2008.

D.W. Browne et al., "A Signaling Scheme and Estimation Algorithm for Characterizing Frequency Selective MIMO Channels", Vehicular Technology Conference, 2005 VTC 2005-Spring, 2005 IEEE 61st Stockholm, Sweden Apr. 30-May 30, 2005, p. 939-944, Piscataway, NJ, USA, IEEE, May 30, 2005.

* cited by examiner

METHOD OF DETERMINING A CHANNEL QUALITY AND MODEM

RELATED APPLICATIONS

This application claims priority as a continuation application under 35 U.S.C. §120 to PCT/EP2007/064498, which was filed as an International Application on Dec. 21, 2007 designating the U.S., and which claims priority to European Application 06405543.7 filed in Europe on Dec. 27, 2006. The entire contents of these applications are hereby incorporated by reference in their entireties.

FIELD

The disclosure relates to the field of multi-carrier data transmission, such as Orthogonal Frequency Division Multiplex (OFDM) data transmission, and to determination of channel quality of plural sub-channels of a multi-carrier data transmission subject to narrowband interferers.

BACKGROUND INFORMATION

For the transmission of digital data, multi-channel data transmission based on Orthogonal Frequency Division Multiplex (OFDM), also known as Discrete Multitone (DMT) modulation, is a known flexible modulation scheme. OFDM spreads the data to be transmitted over a large number of sub-carriers or sub-channels which are included in a transmission band and separated from each other by a well-defined frequency spacing. The latter can ensure orthogonality of the sub-carriers and prevent crosstalk or inter-carrier interference between sub-carriers (i.e., the demodulator for one sub-carrier is not affected by the modulation of the other sub-carriers even though there is no explicit filtering and their spectra overlap). The individual OFDM modulation symbols on each of the carriers represent a number of bits that depends on the choice of the QAM alphabet (i.e., the arrangement of data or constellation points in the quadrature amplitude plain). For instance, 2 bit/symbol for Quadrature Phase Shift Keying (QPSK), or 4 bit/symbol for 16-QAM (Quadrature Amplitude Modulation) is known. The complex processes of modulating and demodulating thousands of carriers simultaneously are comparable to Discrete Fourier Transform operations, for which efficient Fourier transform algorithms exist.

A suitable OFDM modem architecture includes an encoder to multiplex, synchronize and encode the data to be transferred, as well as a modulator to form a discrete multitone signal. The encoder translates incoming bit streams into in-phase and quadrature components for each of a multiplicity of sub-channels (i.e., the encoder outputs a number of sub-symbol sequences that are equal to the number of sub-channels available to the system). A line monitor at the receiver checks the line quality of the sub-channels (e.g. by repeatedly determining the noise-level, gain and phase-shift individually for each of the sub-channels during operation). The background noise power of the totality of sub-channels in the transmission band as well as the bit error rate (BER) and/or the signal-to-noise ratio (SNR) of each individual sub-channel are then used to determine the channel capacity of the sub-channels (i.e., the information density or bit transmission rate that each sub-channel can support). An optimization signal code construction procedure selects an appropriate QAM alphabet or bit allocation scheme that results in a data rate that approximates the sub-channel capacity by considering conditions of limited signal power and maximum bit error rate.

OFDM is, for example, suited for Power Line Communication (PLC). Power line data channels at high or medium voltage are affected by interferers, because the cable types that are used for the transmission of electric power are unshielded and therefore vulnerable for electromagnetic ingress. A known noise scenario on power line channels resulting there from comprises so-called narrowband interferers (i.e., signals with a small bandwidth originating, for example, from radio transmissions and presenting a spectral amplitude rising up to 40 dB above a background noise level deprived of any contribution from narrowband interferers). Likewise, known analogue television signals essentially behave like narrow-band interferers to OFDM. Thus, the power line channel does not present an additive white Gaussian noise (AWGN) environment, but in the frequency range from some hundred kilohertz up to 20 MHz is mostly dominated by narrow-band interference caused by ingress of broadcast stations with a received level generally varying with daytime, and impulsive noise from switching power supplies or other transient phenomena.

The international patent application WO 97/40609 is concerned with the reduction of radio-frequency (RF) interference from narrow frequency amateur radio bands between 1 MHz and 12 MHz in a wide-band multi-carrier transmission system. A "drop" portion of a standard unshielded twisted-pair ADSL subscriber line covering the last 30 m or less up to a remote unit is found to be able to both receive and emit RF signals. In a restricted band which contains the sub-channels prone to interference, no sub-carriers are used for data transmission. In addition, a dummy tone may be used to suppress transmitted power from sidelobe transmissions within that band.

The patent application EP-A 1 137 194 proposes to determine individual SNRs for the sub-channels in a OFDM system and, based there upon, to reallocate data transmission rate and/or signal power to the sub-channels. According to the U.S. Pat. No. 6,456,653 the overall SNR in OFDM systems is estimated during regular operation by determining a noise power of inactive sub-carriers and a signal plus noise power of active sub-carriers, and subtracting the former from the latter to obtain a signal power.

The disclosures of all documents mentioned herein are hereby incorporated by reference in their entireties.

SUMMARY

A method is disclosed of determining a channel quality of plural sub-channels of a multi-carrier data transmission, subject to narrowband interferers, wherein the method comprises: providing a sorted noise spectrum containing spectral noise values of the plural sub-channels in ascending or descending order; splitting the sorted noise spectrum into a first fraction with higher spectral noise values from sub-channels that are subject to narrowband interferers and a second fraction with lower spectral noise values relative to the higher spectral noise values; estimating a net background noise power based on the spectral noise values from the second fraction, disregarding spectral noise values from sub-channels that are subject to narrowband interferers; and determining channel quality based on the estimated net background noise power.

A modem is disclosed for multi carrier data transmission, comprising: means for determining a channel quality of plural sub-channels of a transmission channel subject to narrow-band interferers; means for providing a sorted noise spectrum containing spectral noise values of the plural sub-channels in ascending or descending order; means for splitting the sorted noise spectrum into a first fraction with higher spectral noise values from sub-channels that are subject to narrowband interferers, and a second fraction with lower spectral noise values relative to the higher spectral noise values; means for estimating a net background noise power based on the spectral noise values from the second fraction, disregarding spectral noise values from sub-channels that are subject to narrowband interferers; and means for determining channel quality based on the estimated net background noise power.

BRIEF DESCRIPTION OF THE DRAWINGS

The subject matter of the disclosure will be explained in more detail in the following text with reference to exemplary embodiments which are illustrated in the attached drawings, in which.

The reference symbols used in the drawings, and their meanings, are listed in summary form in the list of reference symbols. Generally speaking, identical parts are provided with the same reference symbols in the figures.

DETAILED DESCRIPTION

Figure 1:
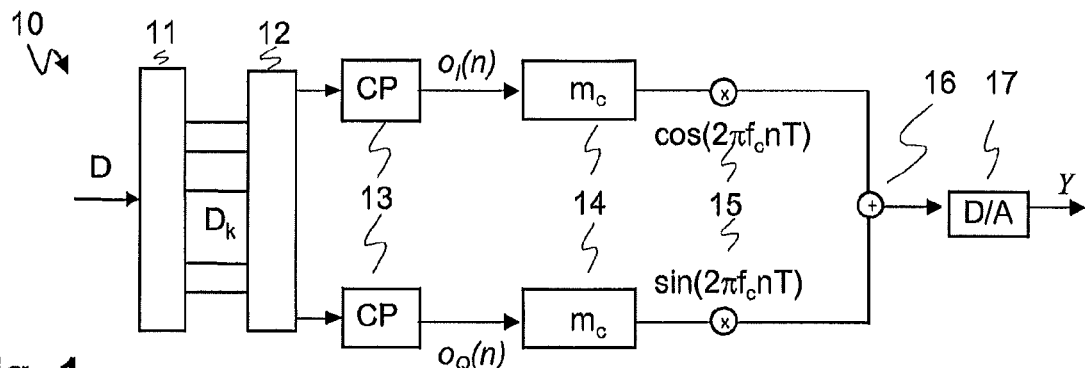
FIG. 1 schematically shows the components of an exemplary OFDM modem.

Exemplary embodiments disclosed herein can increase the overall bit or data transmission rate of a multi carrier data transmission, such as an Orthogonal Frequency Division Multiplex (OFDM) data transmission, over a transmission channel that is subject to narrowband interferers. Exemplary methods are disclosed for determining a channel quality, such as a channel capacity, of a plurality of sub-channels of the transmission channel, and an exemplary modem is also disclosed.

A net background noise power can be estimated for the purpose of determining a channel quality, such as a channel capacity, of an individual sub-channel or sub-carrier, based on which the sub-channel may subsequently be assigned an appropriate bit-allocation scheme or even be masked for being affected by narrowband interferers. The net background noise power is based on spectral noise values of at least two selected sub-channels comprising only white noise-like contributions and excludes; to a reasonable extent; noise contributions or signal power from narrowband interferers. Hence, the net background noise power can be reduced as compared to the known case of a background noise power estimated for the totality of sub-channels or a continuous transmission band. Accordingly, a channel quality determination for an individual sub-channel can yield a higher and more realistic, or less conservative, result than in the latter case. Based on this, a bit allocation scheme or OFDM signal code construction is chosen that provides for optimized data transmission at a data rate that approximates or approaches the more realistic channel quality of the individual sub-channel, resulting in an increased overall bit or data transmission rate.

In an exemplary embodiment, a noise spectral density is recorded. The spectral noise values constituting the spectrum are sorted, and a first fraction or part of the spectrum comprising the higher spectral noise values is disregarded from a subsequent estimation of the net background noise power. Provided that a suitable criterion for splitting the spectrum is available, this approach can be less onerous than an identification of the position of the narrowband interferers, or the affected sub-channels, by repeatedly screening the spectrum for a maximum spectral noise value and eliminating the corresponding sub-channel.

In a first exemplary variant, the sorted noise spectrum is normalized with respect to a value at the centre or middle of the spectrum, and not with respect to a mean spectral noise value that would be influenced or biased in an unforeseeable way by a few sub-channels with an exceptionally high spectral noise value. Thus a subsequent comparison of the normalized spectrum with a fixed, pre-determined first threshold represents a first suitable criterion in the aforementioned sense.

In a second exemplary variant, the net background noise power is estimated by disregarding the contribution of a first fraction of the sub-channels, defined with the help of a critical normalized derivative as a second threshold or suitable criterion in the above sense. To this end, a smoothing operation is performed beforehand by averaging two or more successive normalized spectral noise values, i.e. values that are adjacent or neighbouring according to the sorted noise spectrum.

In an exemplary embodiment, the statistical confidence of the net background noise power can be further improved by disregarding sub-channels at both ends of a second fraction or remaining part of the spectrum (e.g., by eliminating the highest and lowest spectral noise values within the second fraction before estimating the net background noise power).

FIG. 1 shows an exemplary digital implementation of the orthogonal frequency division multiplexing (OFDM) modulation method. In an OFDM base modulator 10, a QAM-vectoriser 11 generates a vector of frequency coefficients in accordance with parallelised digital input bits from the digital input signal D. According to a mapping scheme such as $2^M$QAM (Quadrature Amplitude Modulation) or, as a special case thereof, $2^M$DPSK (Differential Phase Shift Keying) modulation, the frequency coefficients are generally complex $2^M$-ary symbols $D_k$. From the vector of frequency coefficients, an Inverse Fast Fourier Transform (IFFT) 12 generates an in-phase component I and an orthogonal quadrature component Q of a discrete multitone signal. In block 13, each of said components is padded with a cyclic prefix, resulting in two real-valued sequences at sampling rate $1/T_O$, i.e. an in-phase component $o_I(n)$ and a quadrature component $o_Q(n)$ of the modulated digital signal.

In order to prepare the OFDM signal for a frequency shift, the components are upsampled by a factor $m_{IO}$ in upsampler 14, where $m_{IO} > (2f_O + B_O)T_O$, with $B_0$ being the bandwidth of the OFDM transmission band and $f_0$ being its center or frequency offset, must be satisfied to fulfill the sampling theorem. In the next modulation step, in OFDM modulator frequency shifter 16, the mid-frequencies of the spectrum of $o_I$ and $o_Q$ are finally moved to $\pm f_O$. The resulting signals are summed up in an adder 16 to build the transmitted signal which is then converted in a modulator D/A converter 17 to an analogue signal Y for amplification and transmission.

Figure 2:
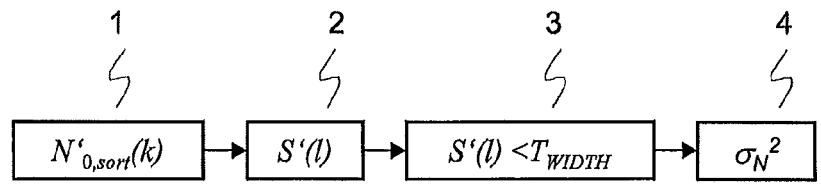
FIG. 2 depicts a flow chart of an exemplary net background noise power estimating procedure.

FIG. 2 depicts a flowchart of a exemplary embodiment of a net background noise power $\sigma_n^2$ (square of the noise variance $\square_n$) estimating procedure according to the disclosure. In step 1, an initial estimation of a noise spectral density is performed and a normalized sorted noise spectrum $\{N'_{0,sort}(k)\}$ is derived. In step 2, a sequence of derivatives $\{S'(l)\}$ is calculated there from. In step 3, the extent of narrowband interference is defined and those sub-carriers not affected by narrowband noise are identified and selected according to a certain criterion such as a comparison of the aforementioned derivatives $\{S'(l)\}$ to a predetermined threshold $T_{WIDTH}$. Finally, in step 4, a net background noise power $\sigma_n^2$ is determined by averaging spectral noise values $N_0(i)$ of the selected sub-carriers. The individual steps will be described in detail below.

An exemplary procedure of measuring channel conditions or noise scenarios is carried out, for example, at start-up of the modem (i.e., before data transmission starts), but may be repeated if, for example, the channel conditions do change (e.g., change significantly). During start-up, a preamble can be executed, comprising, for example, sending and receiving a sequence of test signals including a mute sequence for measuring the noise scenario as detailed in the following.

An exemplary procedure starts with an initial estimation of a raw noise spectrum $\{N'_0(i)\}$ of the transmission channel under consideration, also termed noise spectral density or background power density spectrum. To this end, during the mute sequence mentioned, $N_{EST}$ OFDM symbols devoid of any signalling information are recorded and subsequently averaged, wherein typically $12 < N_{EST} < 100$. Within an individual OFDM symbol time, a number of N samples of the received signal are obtained, with N being equal to the total number of sub-channels. Then a Fourier transform of length N produces a signal $S = (S_0, \ldots, S_{N-1})$ in frequency domain. This is repeated for the $N_{EST}$ OFDM symbols and the absolute squared values of $S_i$ are summed and averaged by division with the number $N_{EST}$ of OFDM symbols:

$$N'_0(i) = \frac{1}{N\_EST} \cdot \sum_{n=0}^{N\_EST-1} |S_i(n)|^2 \quad i = 0, \ldots, N-1. \quad (0.1)$$

The effect of a receiver filter is represented by the complex transfer function $H_{RX}(i)$ that is part of the design of the communication system. The transfer function of the receiver filter might be adaptive and depend on characteristics of the transmission channel, but in any case, $H_{RX}(i)$ is known to the receiver. Its influence on the initially estimated raw noise spectrum $\{N'_0(i)\}$ is then eliminated by the following division:

$$N_0(i) = \frac{N'_0(i)}{|H_{RX}(i)|^2} \quad (0.2)$$

The resulting corrected noise spectrum $\{N_0(i)\}$ containing a plurality of spectral noise values $N_0(i)$ is then sorted (e.g., the spectral noise values $N_0(i)$ are re-arranged so as to form a sequence of ascending or descending spectral noise values). The resulting sequence or array is termed sorted noise spectrum $\{N_{0,sort}(k)\}$, with a sorting index $i = \text{Index}_{Noise}(k)$ being stored in a sorting table.

A known preliminary estimation of the noise variance $\sigma_n$, with the narrowband interferers still present, may then be calculated as follows:

$$\sigma_N = \sqrt{\frac{1}{M_0} \sum_{k=0}^{M_0-1} N_{0,sort}(k)} \quad (0.3)$$

with $M_0$ being the number of active sub carriers, wherein $M_0 \leq N$, N being the total number of sub carriers in the transmission band. The set of active sub carriers comprises all the sub carriers positioned in the pass band of the receiver filter and correspondingly depends on the configurable size of the filter pass band. The set of active sub carriers also comprises sub carriers that are used as pilot signals and that are disregarded in the following, leaving a set of $M \leq M_0$ sub carriers to be evaluated for narrowband interferers.

In a next step of the procedure, the sorted noise spectrum $\{N_{0,sort}(k)\}$ is normalized with respect to its value at the centre (e.g., at the (sorting) index $k = M/2$, yielding a normalized sorted noise spectrum $\{N'_{0,sort}(k)\}$).

$$N'_{0,sort}(k) = \frac{N_{0,sort}(k)}{N_{0,sort}(M/2)} \quad (0.4)$$

From this normalized sorted noise spectrum $\{N'_{0,sort}(k)\}$, a first fraction or sub-spectrum consisting of those sub-channels for which a normalized spectral noise value exceeds a first threshold, is identified. The foregoing normalization with respect to a value at the centre, as compared to a mean value, eliminates any unforeseeable influence of a few sub-channels with an exceptionally high spectral noise value. Thus a comparison with a fixed, pre-determined first threshold is justified and provides a reasonable result. The sub-channels of the first fraction, or their respective spectral noise powers, are considered to be affected by narrowband interferers and consequentially excluded from a subsequent estimation of a net background noise power.

However, and despite the clever normalization introduced above, the reference to a first threshold for the identification of the first fraction can still give rise to some ambiguity as to the determination of the first threshold. A reference to a critical derivative of a continuous noise distribution, or equivalently, a critical difference between two neighbouring values of a discrete sorted noise spectrum, thus presents a viable alternative. In view of the preparation and evaluation of such a derivative as detailed in the following, an averaging or smoothing of the normalized sorted noise spectrum $\{N'_{0,sort}(k)\}$ is interposed. To this end, for each sub-channel, an average of a number of successive values, including the one from the sub-channel itself, is calculated. In other words, for a particular sub-channel with index l, an averaged normalized spectral noise value $S(l)$ is calculated by averaging at least two successive normalized spectral noise values, including the normalized spectral noise value $N'_{0,sort}(k(l))$ of the particular sub-channel/itself and at least one normalized spectral noise value $N'_{0,sort}(k(l)\pm 1)$ of an adjacent or neighbouring sorted sub-channel.

Advantageously, for a particular sub-channel, a lower average or normalized integral $S(l)$ can, for example, be derived as the average of all normalized spectral noise values $N'_{0,sort}(k \geq l)$ that are equal to or lower than the normalized spectral noise value $N'_{0,sort}(l)$ of the particular sub-channel:

$$S(l) = \frac{1}{M-l} \sum_{k=l}^{M-1} N'_{0,sort}(k), \quad l = 0, \ldots, M-1 \quad (0.5)$$

and a derivative or first difference $S'(l)$ of the former is calculated as $$S'(l) = S(l+1) - S(l), l = 0, \ldots, M-2 \quad (0.6)$$

Figure 3:
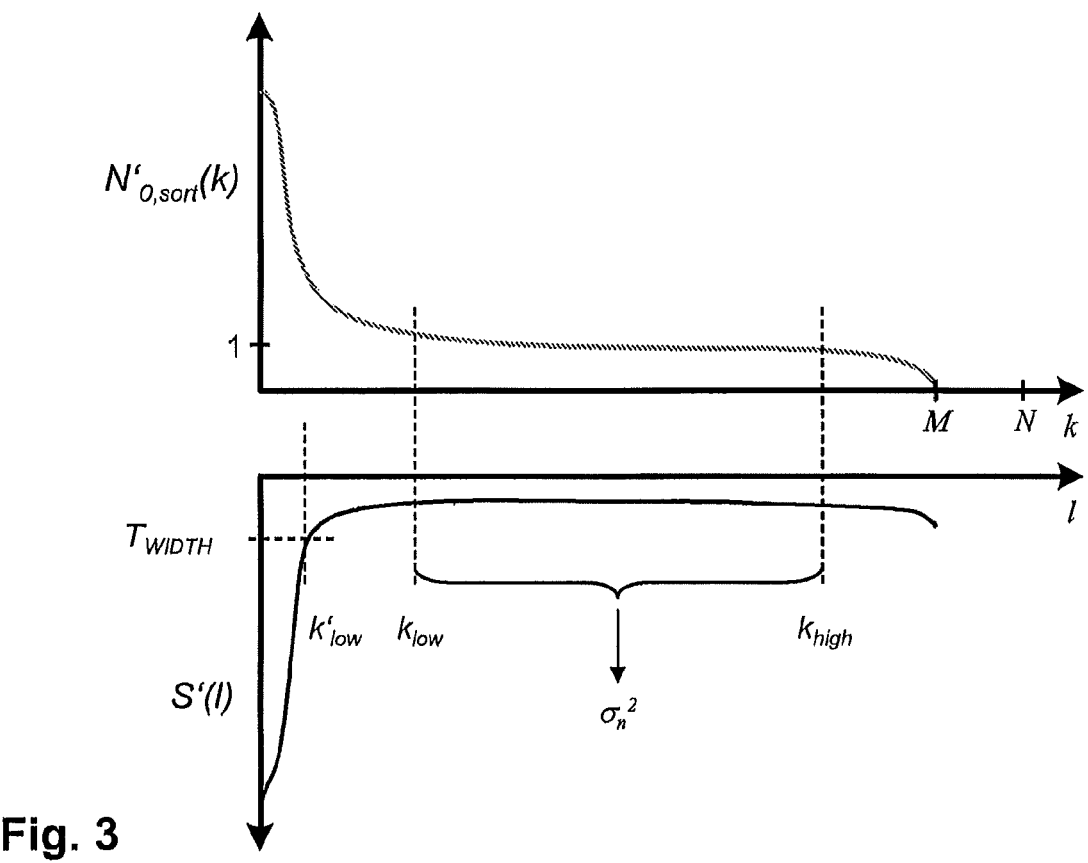
FIG. 3 represents an exemplary normalized sorted noise spectrum $\{N'_{0,sort}(k)\}$ and a derivative $\{S'(l)\}$.

An exemplary result of the normalized sorted noise spectrum $\{N'_{0,sort}(k)\}$ and a sequence of derivatives $\{S'(l)\}$ is shown schematically in FIG. 3.

The resulting sequence of derivatives $\{S'(l)\}$ is now evaluated to classify the spectrum and to identify a first fraction or part of the spectrum for which the spectral noise values $N_0(i)$ are significantly higher than for the remaining part or second fraction of the spectrum. To this end, all indices l with $S'(l) < T_{WIDTH}$, wherein $T_{WIDTH}$ denotes a suitably chosen threshold for the derivative, gradient or first difference, are allocated to the first fraction. The threshold $T_{WIDTH}$ is predetermined (e.g., empirically), in order to find the start of the more or less flat part of the noise spectrum as a criterion to identify the sub-channels considered to be affected by noise power stemming from narrowband interferers. An exemplary value of the threshold $T_{WIDTH}$ is −0.05.

Accordingly, the remaining elements with a sorting index $l \geq k'_{low}$, where $k'_{low}$ is the smallest sorting index of the second fraction or remaining part of the spectrum, are used to obtain a first estimation of the net background noise variance. In order to further improve the estimation accuracy, a predefined number or percentage (e.g., 10%), of the highest and lowest spectral noise values of the second fraction can be skipped. By doing so (e.g., by disregarding the extreme values both at the low and the high end of the remaining part), the statistical confidence of the estimation can be further increased. The estimation of the net background noise power $\sigma_N^2$ is then performed over a net background noise estimation fraction as indicated by the bracket in FIG. 3, and of which the sorting indices are comprised in-between a lower bound $k_{low}$ and a higher bound $k_{high}$:

$$\sigma_N = \sqrt{\frac{1}{k_{high} - k_{low} + 1} \sum_{k=k_{low}}^{k_{high}} N_{0,sort}(k)} . \quad (0.7)$$

This estimated net background noise $\sigma_N^2$ serves as an input for the optimisation procedure of signal code construction as exemplified below.

Fisher statistics or maximum likelihood principle can be applied to generate a spectral mask of narrowband interferers (e.g., to definitely identify the sub-channels that are not to be occupied by the OFDM transmission). To apply Fisher statistic, the sorted noise spectrum $\{N_{0,sort}(k)\}$ is subdivided into two subspaces and the relation of signal energy inside the two subspaces is calculated and compared with a threshold. Subspace A is given by a moving window of size W. Subspace B is equal to the above defined net background noise estimation fraction. The energy $\sigma_N^2$ in subspace B, the squared value of $\sigma_N$ in (0.7), is already known. The Fisher statistic yields $$F_{NB}(k_W) = \frac{\frac{1}{W} \sum_{k \in W} N_{0,sort}(k)}{\sigma_N^2} \quad (0.8)$$

For a window of size W=1 as chosen in the following, the window position index $k_W$ equals the array index k.

Now a subchannel i=$Index_{Noise}(k)$ identified by the channel-index i and the corresponding noise-index k can be masked as affected by narrowband interferers, if the following two conditions are true:
1. the result of Fisher statistic exceeds a threshold $F_{NB}(k) > T_{NB}$
2. the spectral noise value $N_0(i)$ exceeds a threshold $N_0(i) > T_{Noise}$ As the first condition evaluates the power of narrowband interferers in relation to the net background noise power, the absolute power of an interferer (i.e., its spectral noise value $N_0(i)$), could be so small that it would not influence or harm the data transmission quality. Hence the second condition can prevent sub-channels with high relative and low absolute noise levels from being excluded from data transmission.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

10 OFDM modulator
11 QAM vectoriser
12 Inverse Fast Fourier Transform
13 Cyclic Prefix
14 Upsampler
15 Frequency shifter
16 Adder
17 D/A converter

What is claimed is:

1. A method of determining a channel quality of plural sub-channels of a multi-carrier data transmission, subject to narrowband interferers, wherein the method comprises:
   providing a sorted noise spectrum containing spectral noise values of the plural sub-channels in ascending or descending order;
   splitting the sorted noise spectrum into a first subset with higher spectral noise values from sub-channels that are subject to narrowband interferers and a second subset with lower spectral noise values relative to the higher spectral noise values;
   eliminating the highest and lowest spectral noise values within the second subset by a predefined number of sub-channels to produce a reduced second sub-set;
   estimating a net background noise power based on the spectral noise values from the reduced second subset, disregarding spectral noise values from the sub-channels that are subject to narrowband interferers; and
   determining channel quality based on the estimated net background noise power.

2. The method according to claim 1, wherein the estimating of the net background noise power comprises:
   calculating a normalized sorted noise spectrum from the sorted noise spectrum; and
   splitting the sorted noise spectrum into the first subset with normalized spectral noise values above, and a second subset with normalized spectral noise values below, a first threshold.

3. The method according to claim 1, wherein the estimating of the net background noise power comprises:
   calculating the net background noise power as a sum of spectral noise values of the sub-channels contained in the reduced second subset.

4. The method according to claim 3, comprising:
   excluding a sub-channel from data transmission for which a ratio of the spectral noise value to the net background noise power exceeds a threshold $T_{NB}$, and for which the spectral noise value exceeds another threshold $T_{Noise}$.

5. The method according to claim 1, wherein the multi-carrier data transmission is an Orthogonal Frequency Division Multiplex (OFDM) data transmission.

6. The method according to claim 1, comprising:
   determining the channel quality in a power line communication data transmission over a high or medium voltage power line.

7. A method of determining a channel quality of plural sub-channels of a multi-carrier data transmission, subject to narrowband interferers, wherein the method comprises:
   providing a sorted noise spectrum containing spectral noise values of the plural sub-channels in ascending or descending order;
   splitting the sorted noise spectrum into a first subset with higher spectral noise values from sub-channels that are subject to narrowband interferers and a second subset with lower spectral noise values relative to the higher spectral noise values;
   eliminating the highest and lowest spectral noise values within the second subset by a predefined number of sub-channels to produce a reduced second sub-set;
   estimating a net background noise power based on the spectral noise values from the reduced second subset, disregarding spectral noise values from the sub-channels that are subject to narrowband interferers; and
   determining channel quality based on the estimated net background noise power,
   wherein the estimating of the net background noise power comprises:
      calculating a normalized sorted noise spectrum from the sorted noise spectrum;
      calculating, for each of the plural sub-channels, an averaged normalized spectral noise value by averaging a normalized spectral noise value of the sub-channel and at least one successive normalized spectral noise value;
      calculating derivatives by computing a difference between two successive averaged normalized spectral noise values; and
      splitting the sorted noise spectrum into the first subset with derivatives above, and a second subset with derivatives below, a threshold.

8. The method according to claim 7, wherein the calculating of the averaged normalized spectral noise value for each of the plural sub-channels comprises:
   averaging all of the normalized spectral noise values that are not above the normalized spectral noise value of a given sub-channel.

9. The method according to claim 1, wherein the estimating of the net background noise power comprises:
   calculating the net background noise power as a sum of spectral noise values of the sub-channels contained in the reduced second subset.

10. A modem for multi-carrier data transmission, comprising:
   means for determining a channel quality of plural sub-channels of a transmission channel subject to narrowband interferers;
   means for providing a sorted noise spectrum containing spectral noise values of the plural sub-channels in ascending or descending order;
   means for splitting the sorted noise spectrum into a first subset with higher spectral noise values from sub-channels that are subject to narrowband interferers, and a second subset with lower spectral noise values relative to the higher spectral noise values;
   means for eliminating the highest and lowest spectral noise values within the second subset by a predefined number of sub-channels to produce a reduced second subset;
   means for estimating a net background noise power based on the spectral noise values from the reduced second subset, disregarding spectral noise values from the sub-channels that are subject to narrowband interferers; and
   means for determining channel quality based on the estimated net background noise power.

11. The modem according to claim 10, wherein the multi-carrier data transmission is an Orthogonal Frequency Division Multiplex (OFDM) data transmission.

12. The modem according to claim 10, in combination with a high or medium voltage power line for power line communication data transmission.

13. The modem according to claim 10, wherein the means for estimating the net background noise power comprises:
   means for calculating a normalized sorted noise spectrum from the sorted noise spectrum; and
   means for splitting the sorted noise spectrum into the first subset with normalized spectral noise values above, and a second subset with normalized spectral noise values below, a first threshold.

14. The modem according to claim 10, wherein the means for estimating the net background noise power comprises:
   means for calculating the net background noise power as a sum of spectral noise values of the sub-channels contained in the reduced second subset.

15. The modem according to claim 14, comprising:
   means for excluding a sub-channel from data transmission for which a ratio of the spectral noise value to the net background noise power exceeds a threshold $T_{NB}$, and for which the spectral noise value exceeds another threshold $T_{Noise}$.

16. A modem for multi-carrier data transmission, comprising:
   means for determining a channel quality of plural sub-channels of a transmission channel subject to narrowband interferers;
   means for providing a sorted noise spectrum containing spectral noise values of the plural sub-channels in ascending or descending order;
   means for splitting the sorted noise spectrum into a first subset with higher spectral noise values from sub-channels that are subject to narrowband interferers, and a second subset with lower spectral noise values relative to the higher spectral noise values;
   means for eliminating the highest and lowest spectral noise values within the second subset by a predefined number of sub-channels to produce a reduced second subset;
   means for estimating a net background noise power based on the spectral noise values from the reduced second subset, disregarding spectral noise values from the sub-channels that are subject to narrowband interferers; and
   means for determining channel quality based on the estimated net background noise power,
   wherein the means for estimating the net background noise power comprises:
   means for calculating a normalized sorted noise spectrum from the sorted noise spectrum;
   means for calculating, for each of the plural sub-channels, an averaged normalized spectral noise value by averaging a normalized spectral noise value of the sub-channel and at least one successive normalized spectral noise value;
   means for calculating derivatives by computing a difference between two successive averaged normalized spectral noise values; and means for splitting the sorted noise spectrum into the first subset with derivatives above, and a second subset with derivatives below, a threshold.

17. The modem according to claim 16, wherein the means for calculating the averaged normalized spectral noise value for each of the plural sub-channels comprises:
   means for averaging all of the normalized spectral noise values that are not above the normalized spectral noise value of a given sub-channel.

18. The modem according to claim 17, wherein the means for estimating the net background noise power comprises:
   means for calculating the net background noise power as a sum of spectral noise values of the sub-channels contained in the reduced second subset.

\* \* \* \* \*